March 31, 1931. H. K. CHRISTENSEN ET AL 1,798,725
TEMPERATURE TREATING APPARATUS FOR FLUIDS
Filed July 3, 1929
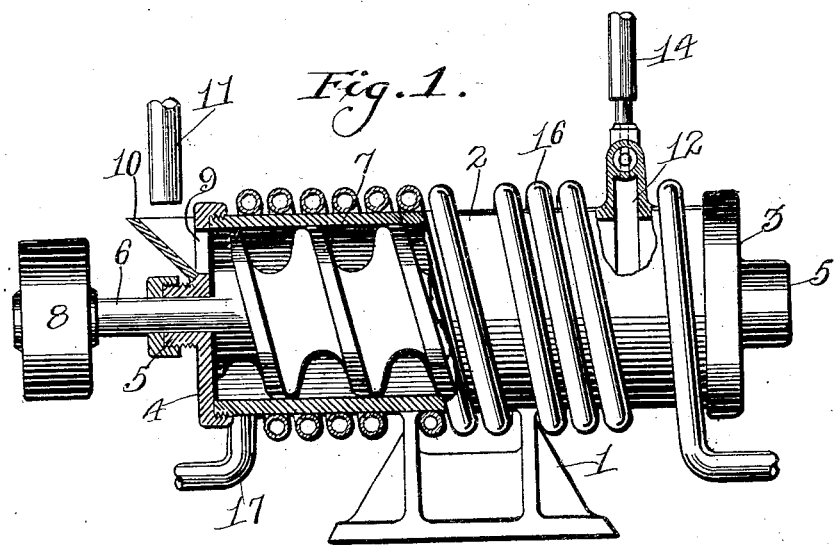
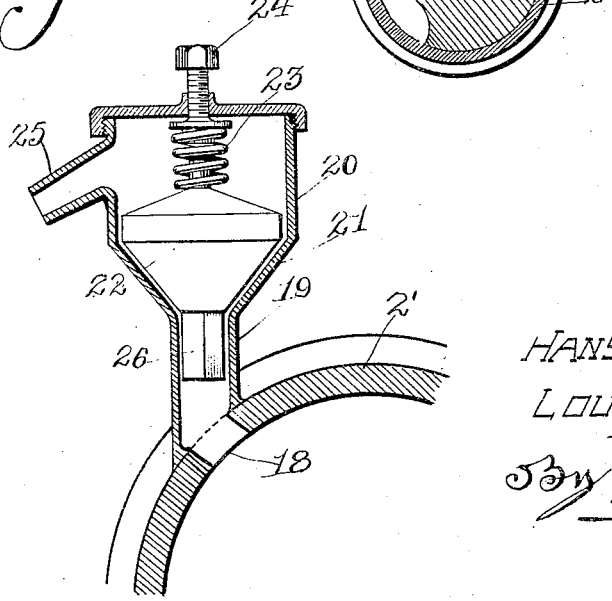
Inventors
HANS. K. CHRISTENSEN
LOUIS. J. BENNETT
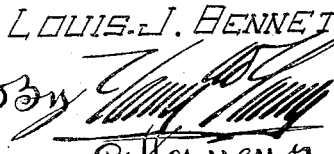
Attorneys Patented Mar. 31, 1931

1,798,725

UNITED STATES PATENT OFFICE

HANS K. CHRISTENSEN AND LOUIS J. BENNETT, OF FORT ATKINSON, WISCONSIN

TEMPERATURE-TREATING APPARATUS FOR FLUIDS

Application filed July 3, 1929. Serial No. 375,783.

This invention relates to an improved temperature treating apparatus for fluids and more particularly for treating freezing confections when in a liquid state.

One of the objects of our invention is the provision of a temperature treating apparatus which is especially adapted for use in treating frozen confections, such as ice cream, or the like, for freezing the liquid cream to a slush consistency, so that the semi-frozen material can be arranged in suitable containers before freezing to a solid state, whereby different designs and different flavors may be put together in divers ways before freezing to a solid state in order to produce frozen ice cream in bricks of different flavors, or other designs could be used in place of bricks.

Another object of our invention is the provision of a temporary treating apparatus for fluids whereby cream or other fluids can be deposited in the device, and after traveling therethrough will be discharged in a semi-frozen condition or frozen to a slush consistency so that the semi-frozen fluids can be readily placed in suitable receptacles and then frozen to a solid state, the fluids when passing through the device being chilled through suitable cooling means and the device is so constructed to prevent back pressure of the semi-frozen material or the cutting off of the inflow of the fluid.

With the above and other objects in view, the invention consists in the novel features of construction, the combination and arrangement of parts hereinafter more fully set forth, pointed out in the claim and shown in the accompanying drawings wherein:

Figure 1 is a side elevation with parts thereof broken away and illustrated in cross section;

Figure 2 is a detail transverse sectional view showing the discharging means; and, Figure 3 is a detail section similar to Figure 2, but illustrating a slightly modified form of discharging means.

Referring now more particularly to the drawings, 1 indicates the base member on which our apparatus is supported, carried by the base is a horizontally disposed cylinder 2, provided at its ends with removable closure caps 3 and 4, each cap supporting a bearing 5 for the operating shaft 6 and a spiral conveyor 7. On the outer end of the shaft 6 is a pulley 8 whereby power may be readily applied to the shaft 6 for rotating the same at a comparatively high rate of speed.

The closure cap 4 is provided with a transverse opening 9 and extended from the opening is a trough-like member 10 which receives the fluid in a liquid state from the inlet pipe 11. At this point, we wish to call attention to the fact that the spiral conveyor 7 is so positioned within the cylinder 2 that the end flight is spaced a suitable distance from the cap member 4 so as to permit free ingress of the fluid through the opening 9 and prevents the semi-frozen fluid from backing up and clogging the opening.

At the forward end of the cylinder 2, we provide a lateral extension 12 which carries a valve 13 to control the outlet of the semi-frozen liquid into the discharge pipe 14. This discharge pipe 14 preferably extends directly upward from the cylinder 2 with its upper end arcuately curved to form a downward discharge portion 15.

Encircling the cylinder 2 and in intimate contact therewith is the cooling coil 16 through which a cooling fluid passes in order to thoroughly chill the cylinder 2 and maintain the same in a comparatively cold state at all times. It will be apparent from the foregoing that the spiral conveyor 7 is rotating at a comparatively high rate of speed at all times and as the fluid 11 enters through the opening 9, it will be conveyed forwardly through the cylinder 10 in a spiral path so that the fluid will be brought into contact with the inner wall of the cylinder and be thoroughly chilled and frozen to a slush consistency or a semi-frozen state before it is discharged by the force of the rotating conveyor out through the discharge pipe 14.

After the device has been used and any material left in the cylinder has been reduced to a liquid state through the rising temperature due to the cutting off of the cooling fluid, it would be drawn off through one end of the cylinder.

In Figure 3 we have illustrated a slightly modified form of discharge valve wherein the outlet opening 18 of the cylinder 2 has communicating therewith the lower tubular end 19 of a discharge valve 20. It will be noted that the discharge valve housing 20 is provided with a conical seat 21 upon which is normally seated a substantially conical shaped valve member 22. This valve member is retained in seated position by means of a coil spring 23, arranged between the valve and the cover of the valve housing. Adjusting screw 24 is provided for adjusting the tension of the spring and the discharge spout 25 extends downwardly from the valve housing.

Extending downwardly from the valve member 22 is a guide stem 26 which is of sufficient length to cause the valve 22 to be seated when pressure is released therefrom. It will be apparent from the foregoing that with this type of valve, the semi-frozen liquid is only discharged from the cylinder 2 during the rotation of screw conveyor 7 which will force the semi-liquid material out through the opening 18 against the lower inclined face of the valve member, unseating the same against the tension of the spring 23.

One of the features in the construction of our device to which we wish to call attention, is the fact that the edges of the spirals of the conveyor 7 operate very close to the walls of the cylinder 2, so as to scrape the material from the walls of the cylinder and prevent clogging of the material which might engage the walls and freeze to a solid state.

The discharge pipe 14 as will be noted in Figure 2, is shown in telescopic design so that the length of this pipe may be readily adjusted to compensate for the required pressure in discharging the material from the cylinder 2 by the spiral conveyor, and this pipe can also be quickly and readily adjusted to accommodate the position of the containers with respect to the cylinder.

We wish it to be understood that while we have described and illustrated the particular types of valves to be used in connection with this improved machine, various other types of valves can be used equally as well.

It will be apparent from the foregoing that we have provided a very simple and inexpensive device of the above character wherein liquids can be treated and frozen to a slush consistency or semi-solid state particularly for use in forming brick ice cream of different flavors and also can be used for producing different designs of various flavors.

We claim:

A device of the class described including a cylinder, bearing sleeves at the ends of said cylinder, a screw conveyor mounted for rotation within the cylinder and having its shaft portions rotatably mounted in said bearing sleeves, said conveyor having its screw portions operating in close proximity to the walls of the cylinder and having the screw at one end spaced from one end of the cylinder, said cylinder having an inlet opening at one end and a trough leading up from said opening, a lateral extension on the cylinder adjacent one end providing a discharge portion, a valved discharge pipe connected with said offset portion, means connected to one end of the screw conveyor for rotating the same at a high rate of speed, and a cooling coil surrounding the cylinder in intimate contact with the outer wall thereof and arranged between the inlet and discharge openings of the cylinder.

In testimony that we claim the foregoing we have hereunto set our hands at Milwaukee, in the county of Milwaukee and State of Wisconsin.

HANS K. CHRISTENSEN.
LOUIS J. BENNETT.